No. 626,428. Patented June 6, 1899.
W. C. JONES.
VEHICLE WHEEL.
(Application filed Feb. 12, 1897.)

(No Model.) 2 Sheets—Sheet I.

Witnesses:
G. G. Allen
Mary W. Upham

Inventor:
William C. Jones,
By A. B. Upham,
Atty.

THE NORRIS PETERS CO., PHOTO-LITHO., WASHINGTON, D. C.

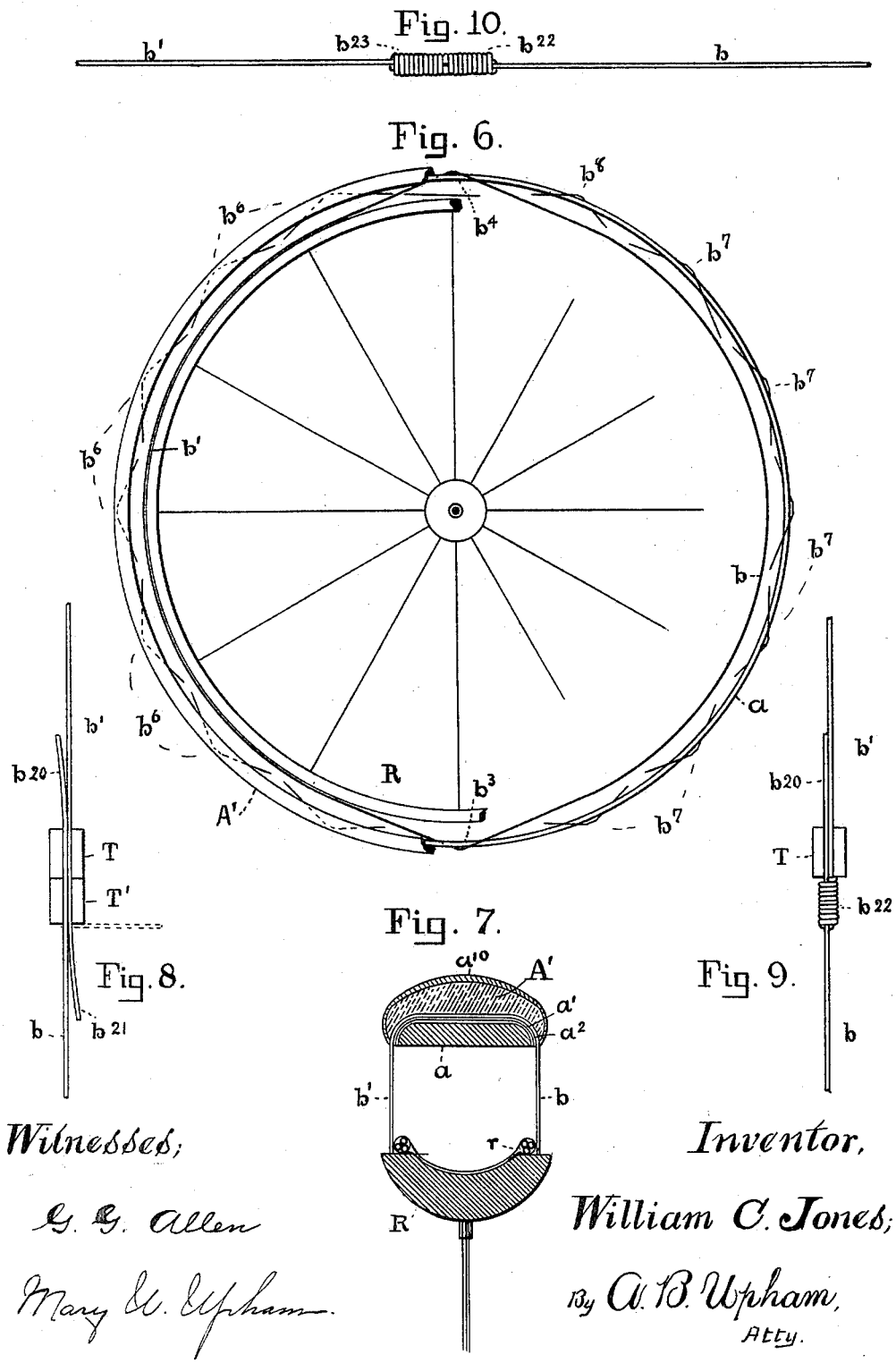

UNITED STATES PATENT OFFICE.

WILLIAM C. JONES, OF LYNN, MASSACHUSETTS.

VEHICLE-WHEEL.

SPECIFICATION forming part of Letters Patent No. 626,428, dated June 6, 1899.

Application filed February 12, 1897. Serial No. 623,108. (No model.)

*To all whom it may concern:*

Be it known that I, WILLIAM C. JONES, a citizen of the United States, residing at Lynn, in the county of Essex and State of Massachusetts, have invented a new and useful Vehicle-Wheel, of which the following is a full, clear, and exact description.

The object of this invention is the construction of a wheel for light vehicles of any kind, and particularly for bicycles, in which the resilient effect of the pneumatic tire can be secured, but without its expense and liability to puncture. In accomplishing this result I have devised the wheel illustrated in the accompanying drawings, in which—

Figure 1:
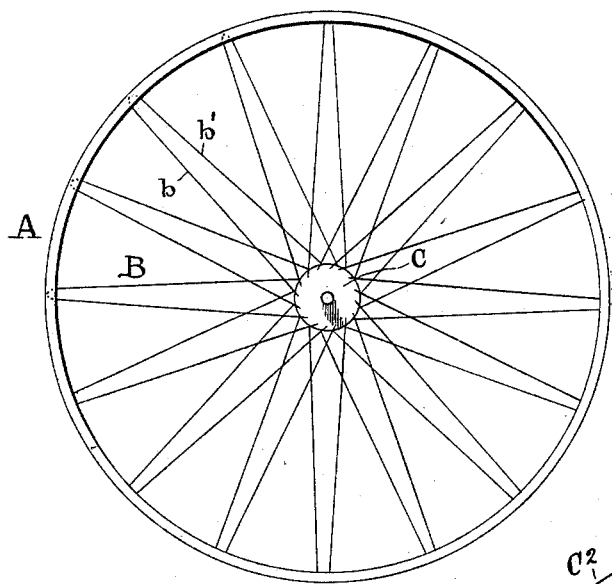
Figure 2:
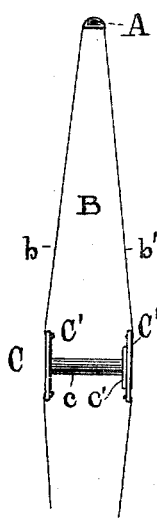
Figure 3:
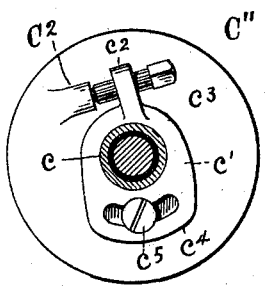
Figure 4:
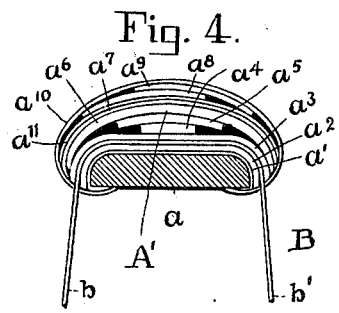
Figure 5:
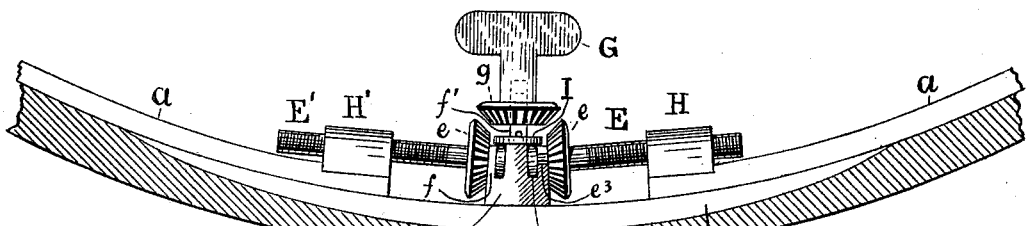

Figure 1 is an elevation thereof. Fig. 2 is a diametrical section of the same. Fig. 3 is a detail view of the hub, showing the means for adjusting the tension upon the spokes of the wheel. Fig. 4 is a cross-section of the rim. Fig. 5 is a view of another form of device for varying the tension upon the spokes. Fig. 6 is a view of my wheel when made with the rim usual in bicycles. Fig. 7 is a cross-section of the rim and tire, and Figs. 8, 9, and 10 are detail views of the means for fastening together the ends of the wire forming the suspension-rings.

Referring to the drawings, A is the periphery of my wheel, B indicates its spokes, and C is the hub. The rim is composed of a resilient hoop $a$, preferably of wood, shaped in cross-section as shown in Fig. 4. About the outer face of this hoop is wrapped the strip $a'$ of sheet-rubber and upon this rubber a strip $a^2$ of felt. The wire $b$ composing a spoke B is bent over this strip of felt, as shown in Fig. 4, and in each case has its ends secured to the hub C. As in Fig. 2, one end of said wire is fastened to the disk C' and its other end $b'$ to the disk C''. Then over these wires is laid the strip $a^3$ of sheet-rubber, upon this latter a narrow strip $a^4$ of thick felt, about this a wider strip of similar felt $a^5$, over this a still wider strip of felt $a^6$, then a strip of rubber $a^7$, over this the fabric $a^8$, upon this two overlapping narrow strips of heavy rubber, and about the whole the rubber covering $a^{11}$. All these strips, it is to be noticed, extend the entire length of the hub's periphery, and I usually introduce a thin coating of rubber-cement between each two layers of the fabric, felt, and rubber. The entire rim is then heated to the proper degree and the whole vulcanized and made into a united body. The object in thus cushioning the exterior of the hoop $a$ with the layers of felt and rubber is to enable the wheel to pass over small inequalities—such as bits of stone, &c.—without the injurious indentation which would result to the unprotected hoop alone; further, to add to the resilience of the hoop when passing larger obstructions and to cross car-tracks at an acute angle without slipping and catching. It will be noticed that the edges of the hoop $a$ are rounded and the strips of felt and rubber are brought down over the same, as shown. This special part aids considerably in enabling my wheel to pass diagonally over car-tracks without slipping.

The single bent wire, which serves for two spokes in my wheel, has its ends, as previously described, attached to the opposite disks C' C'' of the hub. As shown in Fig. 1, I do not fasten these ends in the same plane, but have said ends in planes making angles of fully forty-five degrees with each other relative to the axial center. Furthermore, the disk C'' is made revoluble on the hub and is provided with adjusting devices for forcibly rotating it through a slight arc relative to the other disk. In Fig. 3 is shown a simple means for such adjustment, which comprises the tangent screw $c^3$, rigidly connected with the hub and abutting against the lug $C^2$, projecting from the disk C''. By turning said screw, and thereby giving the disk C'' a slight adjustment, the acute V formed by each wire $b$ $b'$ is broadened and the tension upon the spokes correspondingly increased. The slotted ear $c^4$ and the set-screw $c^5$ engaging the same and the disk C'' fix the latter at the desired point of adjustment. The object in thus varying the tension on the spokes of my wheel is for the purpose of correspondingly affecting the resilience of the wheel's rim. The less the tension upon the wires $b$ $b'$ the more readily does the rim yield and bend inwardly upon its passage over any obstruction. When, however, these wires are drawn very taut, the rim yields much less easily and with a quicker rebound. In this way the same wheels can be adapted for men of very different weights, for I have found that heavy men require bicycles in which the resilience of the wheels is much less yielding than in the case of lighter men. Another arrangement for thus varying the tension on the spokes and correspondingly varying the resilience of the wheel is that shown in Fig. 5. In this case the hoop instead of being made continuous is cut apart at one point and the ends thereat joined by adjusting-screws E E'. These screws are threaded and engage the nuts H H', secured to said hoop ends. The inner ends of these screws are provided with heads $e^2$ and necks $e^3$, held in the projections $f$ of the block F. Said block is formed with the pintle $f'$, which is adapted to enter a central opening in the removable winding-key G. This key has formed at its end the bevel-gear $g$, adapted to mesh with the similar gears $e\ e'$ on the screws E E'. By placing said key upon the pintle $f'$ and pressing it down until its gear meshes with the gears $e\ e'$ the screws E E' can be turned as desired and the hoop ends brought toward each other or farther apart. The hoop-bridge R, by which the space between the hoop ends is closed, need not be fastened to the block F, but is held in position by being cemented to the cushion A'. As will be readily understood, these adjusting-screws for expanding the hoop $a$ will have the same effect in increasing the resilience of the wheel as the wire-tightening device previously described.

Referring to Fig. 6, R indicates the rim of a bicycle of the usual form, $a$ is the hoop, and $b\ b\ b$, &c., are the wires securing the hoop concentric with the rim. In this case each wire $b$ is made an unbroken ring and is passed over the hoop $a$ at two diametrically opposite points, as $b^3\ b^4$, and thence about the rim R, one half, as $b$, on one side of the rim and the other half, as $b'$, at the other side of the rim. Said wire is formed into an unbroken ring by some process of welding or by a method hereinafter described. In Fig. 6 I have indicated eight such wire rings, which, since each crosses the hoop twice, make sixteen points of attachment for the hoop. These points of attachment are indicated by the dotted lines $b^6$ at the left-hand side of the drawings and by the short sections $b^7$ at the right. I do not prolong these lines $b^6\ b^7$ to correspond with the line illustrating the wires $b'\ b$, for the reason that such an aggregation of lines would render it impossible to show the ring form of any one of the same. I do not always, however, use this designated number of wires, for, as a matter of fact, I consider nine a preferable number of such rings. The reason for this is as follows:

As will be seen from an inspection of the right-hand part of Fig. 6, the wires alternate in the direction in which they pass over the hoop. For instance, at $b^3$ and $b^4$ the wire is shown as crossing to the right in front of the hoop. The next, $b^8$, crosses to the left in front of the hoop and the next to the right again. In this way by using an odd number of wire rings no two neighboring crossings are in the same direction. The object in thus alternating the direction of crossing the wires is to obviate the torsional strain which would ensue to the hoop were all the wires to cross uniformly.

In Fig. 6 the hoop $a$ is shown with its cushion A' broken away in order the better to exhibit the crossing of the wires, but at the left-hand side this cushion is illustrated as in place.

Fig. 7 is a transverse section, full size, of the construction illustrated in Fig. 6. Here R indicates the rim, $a$ the hoop, and A' the cushion. The wires $b\ b'$ pass from the hoop to the rim in two parallel planes, but of course tangentially thereto. There are never less than three strands of wire passing along each rim edge at any one point, and these strands are anchored in position upon the rim by being cemented thereto by strips of rubber $r$, although the grip of the wires upon the rim is sufficient to securely hold them in place. The hoop $a$ is covered with the strips of felt and fabric $a'\ a^2$, interposed between the wires $b$ and itself, while about strips and wires extends the cushion A', of heavy felt, crescent-shaped in cross-section. Over this is the protecting-strip of rubber $a^{10}$, made of additional thickness at the tread. It will of course be understood that the tension-adjusting device for this form of my wheel is that illustrated in Fig. 5. Here, however, the block F should be turned upon its side in order to bring the pintle parallel with the wheel's shaft and to enable the key G to be inserted from the side between the hoop and rim.

My method of joining the ends of a wire and so forming it into a ring is as follows: Referring to Fig. 8, T T' are two jaws, as of a vise or pliers, between which the overlapping wire ends are clamped. One end, as $b^{21}$, is first bent up, as indicated by the dotted lines. The jaw T' is then removed and said wire end coiled about the two strands of wire, coiling toward the jaw T until the latter is reached, as shown in Fig. 9, where the coil is indicated by $b^{22}$. In the same way the end $b^{20}$ is bent up, the jaw T removed, and said end coiled toward the coil $b^{22}$ until the same is reached. This produces the result shown in Fig. 10, wherein each coil is, in effect, a ferrule connected to the opposite wire and impressed one against the other by the pull upon the wires.

What I claim as my invention, and desire to secure by Letters Patent, is as follows, to wit:

1. In a vehicle-wheel, the combination of the rim, the hoop resilient diametrically, and the series of wire rings passing over the hoop and about the periphery of the rim, whereby said rim is suspended within said hoop, substantially as set forth.

2. In a vehicle-wheel, the combination of the rim, the hoop resilient diametrically, the series of wire rings passing over the hoop at diametrically opposite points and held in place upon said rim by the tensional strain given to them, and means for varying said strain at will, substantially as and for the purpose set forth.

3. In a vehicle-wheel, the combination of the rim, the hoop resilient diametrically and severed at one point, the series of wire rings passing over the hoop and held in place by the tensional strain given to them, and means for forcibly expanding said hoop and increasing said tensional strain, and thereby varying the resiliency of the wheel, as set forth.

4. In a vehicle-wheel, the combination of the hoop resilient diametrically and severed at one point, the bridge, nuts on said severed ends, the independent but swively-connected screws engaging said nuts and having bevel-gears, and the removable key having gear adapted to mesh with said screw-gears, for the purpose set forth.

5. In a vehicle-wheel, the combination of the resilient severed hoop, the nuts, H, screws, E, having gears, $e$, heads, $e^2$, and necks $e^3$, block F, having projections $f$, and a gear meshing with said gears $e$, for the purpose set forth.

6. In a vehicle-wheel, the combination of the hoop, severed at one point, nuts, H, H', screws E, having gears $e$, the block F, having pintle, $f'$, and adapted to control the inner ends of said screws, and the key, G, having gear, $g$, and fitting said spindle, substantially as and for the purpose set forth.

7. In a vehicle-wheel, the combination of the hoop resilient diametrically, the rim, and the series of wire rings passing over the hoop at diametrically opposite points and held in place upon the rim by the tensional strain given to them, as and for the purpose set forth.

8. In a vehicle-wheel, the combination of the hoop resilient diametrically, the rim, and the wires passing over said hoop and so anchored as to hold the same concentric with the wheel's center, said wires being arranged to cross said hoop in opposite directions alternately, as and for the purpose set forth.

9. In a means for uniting wire-terminals, the wire ends mutually overlapping and coiled back upon themselves, whereby a tensional strain upon said wires draws said coils into close abutment one against the other, and all possibility of separation at such juncture is wholly prevented, as set forth.

10. In a vehicle-wheel, the combination of the hoop, the layers of felt and rubber superposed upon the same, the wires passing about said hoop and partially embedded in said felt and rubber, the felt cushion exterior to the same, and the protecting-strip of rubber overlying the whole, substantially as and for the purpose set forth.

In testimony that I claim the foregoing invention I have hereunto set my hand and seal this 4th day of January, in the year 1897.

WILLIAM C. JONES. [L. S.]

Witnesses:
A. B. UPHAM,
M. W. UPHAM.